United States Patent
Kraemer et al.

(10) Patent No.: US 10,839,096 B2
(45) Date of Patent: Nov. 17, 2020

(54) CRYPTOGRAPHICALLY PROVABLE ZERO-KNOWLEDGE CONTENT DISTRIBUTION NETWORK

(71) Applicant: International Business Machines Corporation, Armonk, NY (US)

(72) Inventors: James R. Kraemer, Santa Fe, NM (US); Jeb R. Linton, Manassas, VA (US)

(73) Assignee: International Business Machines Corporation, Armonk, NY (US)

( * ) Notice: Subject to any disclaimer, the term of this patent is extended or adjusted under 35 U.S.C. 154(b) by 801 days.

(21) Appl. No.: 15/082,509

(22) Filed: Mar. 28, 2016

(65) Prior Publication Data

US 2017/0277909 A1    Sep. 28, 2017

(51) Int. Cl.
*G06F 21/62* (2013.01)
*H04L 29/06* (2006.01)
(Continued)

(52) U.S. Cl.
CPC .......... *G06F 21/6245* (2013.01); *G06F 21/10* (2013.01); *G06Q 20/065* (2013.01); *G06Q 20/12* (2013.01); *G06Q 20/382* (2013.01); *G06Q 20/401* (2013.01); *H04L 9/3218* (2013.01); *H04L 65/4084* (2013.01); *H04L 65/80* (2013.01); *H04N 21/26606* (2013.01); *H04N 21/44204* (2013.01); *H04N 21/4627* (2013.01);
(Continued)

(58) Field of Classification Search
None
See application file for complete search history.

(56) References Cited

U.S. PATENT DOCUMENTS

| 6,044,463 | A | 3/2000 | Kanda et al. |
| 8,688,991 | B1 * | 4/2014 | Sunil ............... H04L 63/06 380/30 |

(Continued)

OTHER PUBLICATIONS

U.S. Appl. No. 15/290,142, filed Oct. 11, 2016.
(Continued)

*Primary Examiner* — Steven S Kim
*Assistant Examiner* — Timothy Paul Sax
(74) *Attorney, Agent, or Firm* — Fleit Intellectual Property Law; Jose Gutman

(57) ABSTRACT

A system, a computer readable storage medium, and methods for delivering content from a zero-knowledge edge server node in a content delivery network to an end user device, ensuring content control by a content provider (i.e. reduce piracy) while ensuring privacy of an end user device. One method includes publicizing that a particular content is available for download from the server node; initiating with the server node a communication session using a zero-knowledge protocol between the end user device and the server node operating in zero knowledge; downloading, while in the communication session, the particular content from the server node to the end user device; and receiving a response message from the end user device, including an indication of a content media player application, using the particular content, successfully executed at the end user device. The indication can be accompanied by a cryptographically verifiable proof of integrity.

17 Claims, 6 Drawing Sheets

(51) Int. Cl.
  *H04N 21/4627* (2011.01)
  *H04N 21/266* (2011.01)
  *H04N 21/442* (2011.01)
  *G06Q 20/06* (2012.01)
  *G06F 21/10* (2013.01)
  *G06Q 20/12* (2012.01)
  *G06Q 20/40* (2012.01)
  *G06Q 20/38* (2012.01)
  *H04L 9/32* (2006.01)

(52) U.S. Cl.
  CPC ..... *G06Q 2220/00* (2013.01); *G06Q 2220/18* (2013.01); *H04L 63/0421* (2013.01); *H04L 63/0428* (2013.01); *H04L 63/126* (2013.01); *H04L 2209/603* (2013.01); *H04L 2463/101* (2013.01)

(56) References Cited

U.S. PATENT DOCUMENTS

| | | | |
|---|---|---|---|
| 2004/0111617 A1 | 6/2004 | Patrick | |
| 2009/0290713 A1* | 11/2009 | Belenky | G06F 21/10 380/277 |
| 2010/0057469 A1* | 3/2010 | Jeffs | H04M 3/4938 704/275 |
| 2010/0115346 A1* | 5/2010 | Lee | H04L 67/32 714/49 |
| 2014/0195809 A1 | 7/2014 | Solow et al. | |
| 2014/0348326 A1* | 11/2014 | Meyer | H04L 9/008 380/255 |
| 2015/0012656 A1* | 1/2015 | Phillips | H04L 47/26 709/226 |
| 2015/0379510 A1* | 12/2015 | Smith | H04L 9/3242 705/71 |
| 2017/0091750 A1* | 3/2017 | Maim | H04L 9/3236 |
| 2017/0134765 A1* | 5/2017 | Uhr | H04N 21/2347 |

OTHER PUBLICATIONS

Bardis, N., et al.,"Fast subscriber identification based on the zero knowledge principle for multimedia content distribution", International Journal of Multimedia Intelligence and Security, Jan. 2010, pp. 1-15, vol. 1, No. 4.
U.S. Appl. No. 141970,966, filed Dec. 16, 2015.
U.S. Appl. No. 14/752,230, filed Jun. 26, 2015.
U.S. Appl. No. 14/858,389, filed Sep. 18, 2015.

* cited by examiner

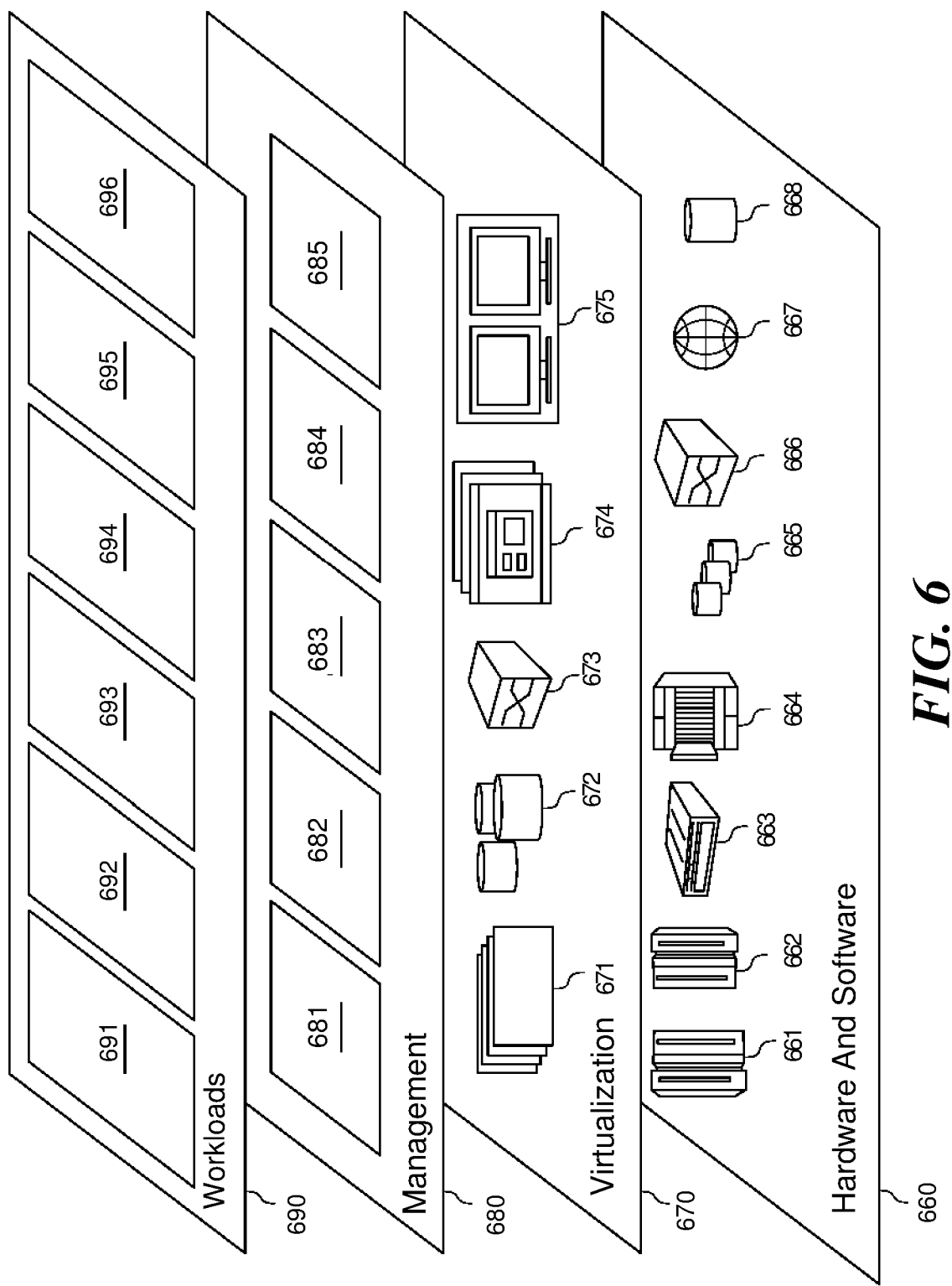

US 10,839,096 B2

CRYPTOGRAPHICALLY PROVABLE ZERO-KNOWLEDGE CONTENT DISTRIBUTION NETWORK

BACKGROUND

The present invention generally relates to content delivery networks, and more particularly to a zero knowledge content delivery network that delivers content on demand to end users and consumers of the content assuring content delivery security, integrity, and assurance that the content is used only according to agreed restrictions, for content providers while maintaining privacy of the end users and consumers.

Content owners and providers, such as movie studios and music studios, require strong assurance against unauthorized copying and use of licensed content distributed to end users and consumers. Examples of licensed content include movies, songs, games and other software applications. Users often dislike content distribution services which give the user no choice regarding the collection of their personal data including, for example, their personal viewing/listening habits and ability to make personal archive copies of licensed content.

Content delivery services such as Netflix, HBO, Apple, etc., commonly use Content Delivery Networks (CDNs), such as the Akamai CDN offered commercially by Akamai Technologies, Inc., to cache popular bulk content (e.g., movies, applications, songs, etc.) in datacenters located close to the end user and consumer—i.e., generally close to the "last mile" networks such as DSL, Cable, and metro fiber for residential users, and within popular collocation data centers for enterprise users. Such CDNs provide content delivery services with more efficient use of network bandwidth, low packet loss, low latency, and high throughput; providing valuable networking resources for on-demand content delivery services.

Existing content providers use digital rights management (DRM) with weakly assured player-applications in user devices, such as mobile phones, tablets, DVD players, set top boxes, and smart televisions, to deliver content over CDNs to end users and consumers. On the one hand, the use of existing DRM protection of content delivered over existing CDNs assures content owners and providers against piracy of their content. On the other hand, these existing solutions provide full knowledge of consumer personal information such as consumer viewing habits to third party content delivery services, such as, but not limited to, Net-Flix, HBO, Apple, Hulu, Google, and Amazon.

No existing content delivery services delivering content over CDNs provide meaningful privacy for end users and consumers of licensed content.

BRIEF SUMMARY

According to various embodiments, disclosed is a cryptographically assured distributed private cloud and content delivery network, and zero-knowledge assurance that features both content protection and end user privacy. This cryptographic zero-knowledge assures both integrity for content owners and privacy for end users. Further, various embodiments disclosed, enable the creation of zero-knowledge content delivery systems comparable to NetFlix, Hulu, Google, Amazon, Apple App Store, Google Play and Amazon App Store, which can provide both the cryptographic assurance of content control required by content owners to monetize their content free of piracy, and a strong guarantee of privacy for end users and content consumers.

According to various embodiments of the present disclosure, a new and novel method, information processing system, and computer program product, enable zero-knowledge edge server node in a content delivery network to distribute robustly anonymized content to end users, to advertise and make available licensed content for the anonymous consumption of end users. Various embodiments of the present invention build upon the services offered by NetFlix, Hulu, Google, Amazon, and others. Zero-knowledge content delivery services may be advertised into this existing distributed registry which may include the playing of licensed content. Content media player applications at end user devices can be checked beforehand using zero knowledge assured computing techniques, such as SCIP, to assure that they will not be executed unmodified from a known acceptable state which does not permit the unauthorized copying of the licensed content or the playing of the content outside agreed parameters in a smart contract.

When a consumer initiates a transaction to play licensed content, according to certain embodiments, a cryptocurrency system executes a smart contract over the chosen cryptocurrency network, such as bitcoin. The smart contract is executed anonymously using enabling art based on Bitcoin and similar cryptocurrencies which include multiparty smart contracts. Upon execution, the smart contract ensures the transfer of an agreed quantity of cryptocurrency based on the value of the desired content; this transaction is ensured to be based on the delivery of the content from a ZK edge server in a content delivery network to a ZK-assured content media player application at the end user device, and the availability and reservation of the appropriate amount of cryptocurrency in the selected account of the consumer.

More specifically, in one example, disclosed is a system, method, and computer readable storage medium for publicizing, with a zero-knowledge server node in a content delivery network, via a registry readable by one or more information processing systems other than the zero-knowledge server node and communicatively coupled with the content delivery network, that a particular content is available for download from the server node using a zero-knowledge protocol in a communication session with the server node operating in zero knowledge; receiving, at the zero-knowledge server node, a connection request transmitted from an end user device communicatively coupled with the content delivery network; initiating, with the zero-knowledge server node in response to the connection request, a communication session using a zero-knowledge protocol between the end user device and the server node operating in zero knowledge; downloading, while in the communication session with the zero-knowledge server node operating in zero knowledge, at least the portion of a content media player application and at least a portion of the particular content from the zero-knowledge server node and destined for reception by the end user device, the at least a portion of the content media player application including digital rights management technology using zero-knowledge verifiable computing to enforce usage conditions on the particular content received at the end user device; and receiving, with the zero-knowledge server node operating in zero knowledge, a response message from the end user device, the response message including an indication of whether the at least the portion of the content media player application has successfully executed at the end user device.

In one example, a portion of the content media player application is sent to the one user device using a zero-knowledge verifiable computing to ensure privacy of the user. Also, payment is received from the one user device as payment for a service to electronically deliver the multimedia content over a network to the user system. It can be a cryptocurrency, such as bitcoin.

Furthermore, according to various embodiments, disclosed is a computer-based method for delivering content from a server node in a zero-knowledge content delivery network to an end user device, ensuring content control by a content provider while also ensuring privacy, with respect to the zero-knowledge content delivery network, of an end user using the end user device to receive the content, the method comprising: executing, with an end user device, at least a portion of a content media player application using a zero-knowledge protocol in a communication session with a server node of a zero-knowledge content delivery network, the zero-knowledge protocol maintaining privacy, with respect to the zero-knowledge content delivery network, of an end user using the at least a portion of the content media player application to receive and/or play the content at the end user device; initiating, with the at least a portion of the content media player application executing at the end user device, a communication session using a zero-knowledge protocol between the end user device and the server node operating in zero knowledge; receiving, with the end user device while in the communication session using the zero-knowledge protocol, at least a portion of content transmitted by the server node and destined for reception at the end user device, while maintaining privacy, with respect to the content delivery network, of an end user using the at least a portion of the content media player application at the end user device, the at least a portion of the content media player application including digital rights management technology using zero-knowledge verifiable computing to enforce usage conditions on the content received at the end user device; sending, from the end user device and destined for reception by the server node while in the communication session using the zero-knowledge protocol, a response message including an indication of whether the at least the portion of the content media player application has successfully executed at the end user device; based upon the response message including an indication indicating a successful execution, accessing the content using the content media player application; and otherwise not accessing the content using the content media player application. An indication, in the response message, of successful execution of the content media player can be accompanied by a cryptographically verifiable proof of integrity of the content media player.

BRIEF DESCRIPTION OF THE DRAWINGS

The accompanying figures wherein reference numerals refer to identical or functionally similar elements throughout the separate views, and which together with the detailed description below are incorporated in and form part of the specification, serve to further illustrate various embodiments and to explain various principles and advantages all in accordance with the present invention, in which:

FIG. 6 depicts abstraction model layers according to an embodiment of the present invention.

DETAILED DESCRIPTION

Figure 1:
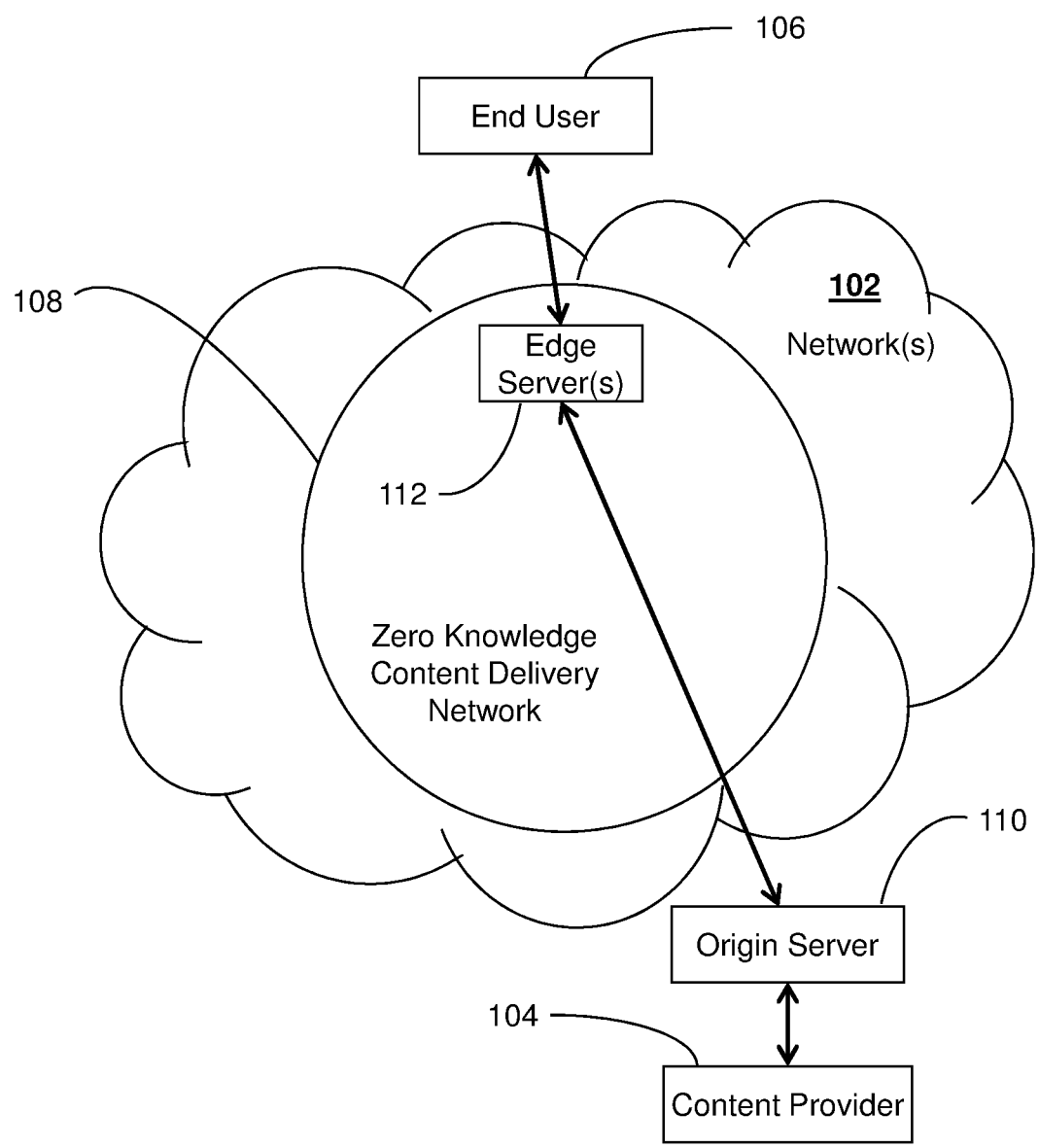
FIG. 1 is a diagram illustrating an example of a content delivery network used to deliver content from content providers to end users and consumers demanding privacy, according to an embodiment of the present invention.

As required, detailed embodiments are disclosed herein; however, it is to be understood that the disclosed embodiments are merely examples and that the systems and methods described below can be embodied in various forms. Therefore, specific structural and functional details disclosed herein are not to be interpreted as limiting, but merely as a basis for the claims and as a representative basis for teaching one skilled in the art to variously employ the present subject matter in virtually any appropriately detailed structure and function. Further, the terms and phrases used herein are not intended to be limiting, but rather, to provide an understandable description of the concepts.

The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated. The terminology used herein is for the purpose of describing particular embodiments only and is not intended to be limiting of the invention.

According to various embodiments of the present disclosure, disclosed is a system and method to maintain privacy through zero-knowledge operation of content delivery network servers, while content is delivered to end users over a content delivery network that typically caches popular content close to the end user without compromising end user or content provider privacy. That is, various embodiments according to the present disclosure provide both secure and efficient delivery of content to end users over a content delivery network while also maintaining end user privacy.

This is accomplished, according to various embodiments, using cryptographically assured distributed private cloud and zero-knowledge assurance. This cryptograhic zero-knowledge operation of content delivery network servers in a content delivery network assures both security of content for content owners and privacy for end users, and may be integrated with cryptocurrency smart contracts or optionally using cryptocurrency smart contracts, or similar technologies. Further, the disclosed system and method enables the creation of a system comparable to NetFlix, Hulu, Google, Amazon, and others instant video and other content from online stores, such as the Apple App Store, Google Play and Amazon App Store which provides both the cryptographic assurance of content control required by content owners to monetize their content free of piracy, and a strong guarantee of privacy for content consumers.

Using similar techniques for Probabilistically Checkable Proof (PCP) and Zero Knowledge (ZK) proof, various embodiments of the invention comprise an Assured (Trusted, optionally Provable through Probabilistically Checkable proofs) Zero Knowledge Content Delivery Network (CDN). Such CDNs deploy Cache Nodes, also referred to as edge server nodes, edge servers, cache server nodes, and cache servers, which can deliver content on demand near the edge of the network while operating in zero knowledge, e.g., without storing a record of which content was delivered to whom at any given time. That is, these Cache Nodes, operating in zero knowledge, comprise typically datacenters located close to the end user and consumer—i.e., generally close to the "last mile" networks such as DSL, Cable, and metro fiber for residential users, and within popular collocation data centers for enterprise users.

Two example mechanisms are disclosed as follows.

1. A Zero Knowledge Cache, also referred to as a zero knowledge server node or a zero knowledge cache node, advertises content, optionally stored in encrypted form, which is delivered to end user without storing information regarding the transaction, or stored only in secure form using "break-glass" security which allows for recovery of the transaction history under strictly controlled circumstances such as a subpoena and with cooperation of the content provider and the CDN provider. Such connections may set up connections using Network Address Translation (NAT) dynamically configured in the network equipment to prevent trivial network traffic analysis from determining which content was delivered to which end user at which time. This method allows the Cache to operate with less CPU resources simply by setting up an ephemeral NAT session on the network equipment and delivering the content to the perceived IP address of the consumer without storing session state, or storing state only using a break-glass method as will be more fully discussed below.

2. Zero Knowledge Cache software passes the content to the end user's actual IP address while operating in Zero Knowledge, without recording session activity or recording it only within the context of a "break glass" system that allows discovery of session log data only under strictly controlled circumstances as described above.

In each example case listed above, a "content player" or downloader/checker of the content comprises a Provable or Attested program which the CDN checks for validity using either PCPs or Trusted Computing.

The content player or downloader/checker may exist in the form of a Secure Executable using IBM SecureBlue++/ACN, Intel SGX, or comparable secure execution environments. Correct non-tampered execution in one of these forms may be proven using Trusted Computing or using some form of PCP.

Content may be stored and delivered in encrypted form with a shared key, or in encrypted form using a unique key per end user.

The availability of a particular item of content may be advertised using a Distributed Registry similar to that described in U.S. patent application Ser. No. 14/752,230, filed on Jun. 26, 2015, the entire disclosure of which being hereby incorporated by reference; or similar to any scalable registry of available content and services. Content providers may use Public Key Infrastructure (PKI) to sign content in order to prevent illegitimate content from being distributed in their names; both CDNs and an end user's content player or downloader/checker would be able to check these signatures for content validity and integrity prior to use, or prior to purchase transaction completion using cryptocurrency Smart Contract transactions. Examples of integrated cryptocurrency payment for services are described in U.S. patent application Ser. No. 14/858,389, filed on Sep. 18, 2015, the entire disclosure of which being hereby incorporated by reference. Examples of management and monetization of licensed content are described in U.S. patent application Ser. No. 14/970,966, filed on Dec. 16, 2015, the entire disclosure of which being hereby incorporated by reference.

End user device software would, according to various embodiments, probe the CDN caches in Cache Server nodes in the CDN advertised in the Registry not only for availability of the desired content but the expected performance of delivery, including "ping time", i.e., latency of basic network connection, and factors such as CDN Cache node CPU and network activity, estimates of time to deliver a whole piece of content, and steady state speed to deliver the content. Varying pricing to deliver the content at various speeds and qualities (such as with SD vs. HD Video, or various levels of quality) may also be advertised and offered as choices to the end user depending on the Cache Server node's and the network's utilization.

According to various embodiments, the Zero Knowledge CDN advertises content caching services into the Registry for specific prices which may be determined algorithmically based on various factors such as size, geography, and content type. The CDN service according to these embodiments need not be told directly whether such content is of an undesirable nature according to the preferences of the CDN service provider, leaving the enforcement of any such terms of service to a separate content reputation service, e.g., crowd-sourced by content consumers using a Zero Knowledge Reputation Service. According to one embodiment, the CDN service provider may be assured of a reasonable exclusion of, for example, prurient or illegal content without any specific knowledge of the identity of any specific piece of cached content—i.e., the reputation service would enable exclusion of such content on a per-item or a collective per-provider basis based on feedback from the content consumers provided in zero-knowledge.

Non-Limiting Definitions

The term "content" is intended to broadly define information that may be delivered, but not necessarily, through a communication network, which can include a content delivery network, from a content provider to an end user, or consumer of the content, using an end user device. Content can include, but is not limited to, any one or more of the following types of content: video, movies, images, applications, games, programs, software, audio, music, songs, and the like. Content can be stored in memory, in whole or in any portion thereof, in many different forms, including, but not limited to, an encrypted form, unencrypted form, digital form, file form, message form, packet form, chunk form, and the like. Content can typically, but not necessarily, be used or consumed by an end user using a content media player, also referred to as a content media player application, at least partially executing on an end user device.

The term "cryptocurrency" is used to mean a medium of exchange using cryptography to secure the transactions and to control the creation of new units. Cryptocurrencies are a subset of alternative currencies, or specifically of digital currencies. Bitcoin is an example.

The phrase "destined for reception" is intended to broadly describe a set of one or more communication units, such as packets or chunks, transmitted in a communication network and including identification of a destination at an information processing system communicatively coupled with the communication network. Such identification can include, but is not limited to, an address information and/or a header information that identifies the destination at the information processing system to a component of the communication network to assist in delivering the set of one or more communication units to the destination at the information processing system through communication in the communication network. A non-limiting example of use of this phrase is the following: "at least a portion of content transmitted by the server node and destined for reception at the end user device".

The term "integrity" or "integrity of content" is used to mean using digital rights management (DRM) systems to guard against piracy and to ensure license conditions are met. The DRM system provides access control to the content. The access controls typically include one or more of viewing, storing, copying controls, or a combination thereof.

The phrases "operating in zero knowledge" or "operate in zero knowledge" are intended to describe a method of operation of one or more server nodes in a content delivery network, in which each such server node stores: 1) no session information from a communication session with an end user device, 2) no information identifying the specific end user requesting particular content download from the server node, and 3) no IP address of the specific end user device that requested and downloaded the particular content.

The phrase "verifiable computing" in cryptography, is a method by which one party, the prover, or as may be also used in this patent a "user" or an "end user", can prove to another party, the verifier, or as may be also used in this patent a "content provider" or "service provider", providing content that a program (e.g., a "content media player" playing certain content) has been or is being executed correctly and without modification or tampering.

The phrase "zero-knowledge verifiable computing" is a method of verifiable computing which can also function as a zero-knowledge protocol. Examples of zero-knowledge verifiable computing are a succinct computational integrity and privacy (SCIP) technique, a zero-knowledge succinct non-interactive argument of knowledge (zk-snark) technique, and a zero-knowledge protocol is a probabilistically checkable proof (PCP) technique.

A "zero-knowledge protocol", in cryptography, is a method by which one party, the prover, or as may be also used in this disclosure a "user" or an "end user", can prove to another party, the verifier, or as may be also used in this disclosure a "content provider" or "service provider" providing content that a given statement is true, without conveying any information apart from the fact that the statement is indeed true.

The terms "zero knowledge content delivery network" or "ZK content delivery network" or "ZK CDM" are intended to broadly define a content delivery network where each server node that delivers content to end user devices operates in zero knowledge.

Content Delivery Network Topology

Referring to the example of FIG. 1, one or more networks 102 provide communication of content between a content provider 104 and an end user 106. The one or more networks, in the example, comprise a wide area network topology that may include wired and/or wireless networks and may include the Internet.

A content delivery network 108, in the current example, is overlayed on top of the one or more networks 102, and is used to deliver content from the content provider 104 to the end user 106. The content delivery network 108, according to the example, comprises a large distributed information processing system having a large number of server nodes interconnected over wide geographic regions and running sophisticated software algorithms to facilitate delivery of content from content providers to end users across the content delivery network server nodes.

An origin server 110, communicatively coupled with the content delivery network 108, hosts the content provided by the content provider 104. The origin server 110 could deliver content to the end user 106 using delivery network mechanisms outside of the content delivery network 108. That is, the end user 106 could access and download content directly from the origin server 110. However, there are significant advantages for the content provider 104 and for the end user 106 to take advantage of the content delivery network 108 to deliver the content. For example, the content provider 104 can serve a much larger number of end-users and with better latency performance in delivering content by utilizing edge server(s) 112 that cache content, typically popular content, in the content delivery network 108 and that are located near the end users 106. These edge servers 112 can also be referred to as edge server nodes, cache server nodes, cache nodes, or cache servers.

Additionally, the content provider 104 can improve overall content delivery throughput to a large number of end users by having copies of the content cached at the edge server(s) 112 located near the end users 106. The end users 106 will not all be accessing the one origin server 110 for downloading the same content. The end user 106 benefits from the content delivery network 108 low latency and high throughput while receiving content delivery from the edge servers 112.

Continuing with the example, the end user 106 accesses the content by interacting directly with one or more edge servers 112 in the content delivery network 108. Content delivery services such as Netflix, HBO, Apple, etc., commonly use Content Delivery Networks (CDNs), such as the Akamai CDN offered commercially by Akamai Technologies, Inc., to cache popular bulk content (e.g., movies, applications, songs, etc.) in datacenters located close to the end user 106 and consumer—i.e. generally close to the "last mile" networks such as DSL, Cable, and metro fiber for residential users, and within popular collocation data centers for enterprise users. As has been discussed above, such CDNs provide content delivery services with more efficient use of network bandwidth, low packet loss, low latency, and high throughput; providing valuable networking resources for on-demand content delivery services to end users.

The CDN 108, according to the present example, operates in zero knowledge because at least the edge server nodes 112 store no session information from a communication session with the end user 106, no information identifying the specific end user requesting the content, and no IP address of the specific end user device that requested and downloaded the content. That is, the end user device 106, e.g., operating a content media player at the end user device 106, can securely and privately interact with the edge server node 112 operating in zero knowledge, and accordingly also with the CDN 108, while downloading content from the edge server node 112 destined for reception at the end user device 106.

The content provider 104 has delivered content over the content delivery network 108 to the edge server node 112. The edge server node 112 has cached the content for future delivery to end users requesting the particular content from the edge server node 112 (which may also be referred to as a cache node 112). The content provider 104 does not process (or track) user-specific and personal information from end user requests for content, where these end user requests are being requested at the edge server node(s) 112 by the end users 106.

The content media player is executed at the end user device 106 using zero-knowledge protocol with the edge server node 112 operating in zero knowledge to ensure the privacy of the user, with respect to the zero-knowledge content delivery network. This effectively anonymizes end user requests for content from the content providers thereby enhancing the privacy of the end users and consumers.

The integrity and security of the content during content delivery is maintained for the content provider 104 through one or more of the following: secure content distribution (e.g., using DRM and cryptography to guard against piracy and to ensure license conditions are met), zero-knowledge verifiable computing, and zero-knowledge protocol to provide probabilistically checkable proof (PCP) that a program (e.g., a "content media player" playing certain licensed content) has been or is being executed correctly and without modification or tampering.

For example, an end user device 106, such as a computer or phone, can download certain content from the edge server node 112 in the CDN 108, where the content provider 104 (who provided the certain content) in this example is Amazon. A secure program, such as a digital rights management content media player application that the content provider 104 trusts, is to be executed on the end user device 106 to ensure the integrity of the content. That is, the content is protected against copying and other unauthorized uses. The user 106, on the other hand, is nervous about letting any third party code execute on his/her device. There is personal identifiable information on the user device 106, such as, names, contact lists, previous viewing habits, and more that the user does not want to share. However, without giving up the privacy of the user device 106, the user is willing to execute the program as long as the user can convince the CDN 108 and the content provider 104 that the output of the program execution is correct without compromising the user's privacy.

Stated differently, if proving the program being executed on the user device 106 requires knowledge of some secret information on the part of the user, the definition implies that the CDN 108 and the content provider 104 will not be able to prove the statement in turn to anyone else, since the CDN 108 and the content provider 104 do not possess the secret information. Notice that the program being proved through execution on the user's device 106 must include the assertion that the user has such knowledge otherwise, the statement would not be proved in zero-knowledge, since at the end of the protocol the content provider 104 would gain the additional information that the user 106 has knowledge of the required secret information. If the statement consists only of the fact that the user 106 possesses the secret information, it is a special case known as zero-knowledge proof of knowledge, and it nicely illustrates the essence of the notion of zero-knowledge proofs: proving that one has knowledge of certain information is trivial if one is allowed to simply reveal that information; the challenge is proving that one has such knowledge without revealing the secret information or anything else.

Cryptographically Assured Content Media Player Application or App Wrapper

A content media player application or a wrapper in which application content can be used is created which allows for the player to perform only the services allowed by the content owner. For example, the permitted services typically are to play the licensed media once or for a specified rental period, or to allow the use of an application with access only to certain data and services once or for a specified time or based on other constraints. This content media player application or wrapper can be compiled using SCIP, or a similar method of cryptographical proof against tampering and screen capture, and the proof of assured execution is recorded. This may be done once, with the proof provided to content owner and end user along with a cryptographic hash of the player/wrapper, both hash and proof of assurance made public on a peer to peer fabric or otherwise. The term wrapper used here means a computer program that works with a preexisting program, such as a preexisting content media player application or game, program, or software utility, to assure execution is recorded. This is contrasted with a separate standalone content media player application.

Alternatively or additionally it can be performed at the time of content consumption. The proof, which may include interactive proof whereby the player proves correct operation continually as it executes, and not just at successful termination, together with proof of successful program exit parameters, e.g. play time, number of times played, any in-app content purchased, and more is made available both to the content owner and the consumer to ensure compliance with the terms of the smart contract. On termination or alternatively at time of initial stage execution when the player is initiated, or continually as the player executes, the smart contract can be at least partially fulfilled and a cryptocurrency smart contract transaction is completed based on the output of the app and accompanying assurance proof. The cryptocurrency transaction concludes in zero knowledge, providing three-way anonymity/privacy between the consumer, content owner, and automated content broker parties. According to the smart contract execution if the player fails, the cryptocurrency transaction does not complete, and if the cryptocurrency transaction fails, the authorization of the app or player fails.

The result is use or consumption of an app or other paid content procured, executed or played, and paid for through cryptocurrency capable of supporting basic two-way and three-way smart contract digital transactions make it cryptographically infeasible to play content without paying, to gain payment without providing the requested service, and for either party to gain information about the other.

Cryptographically Trusted Base Platform

Additionally, it is possible to include in the content media player application parameters and tests to ensure that the content is accessed only on assured workstations, mobile devices, etc., even to specifying maximum display resolution, acceptable device types and number of screens, geography (if a reliable source of this information is available through the executing device) or any other specifications—all the preceding of which can be tested by the content media player application using trusted computing and/or secure boot attestation of the player platform in addition to the content media player application itself. In this case, the content media player application performs a standard trusted computing group-style attestation of the base platform on which the app is to be run, and fails to execute if the platform is in an untrusted state. Even more robust assurance against tampering can be provided by requirement of a device with specific protections against real-time tampering in memory such as those available in Intel SGX or IBM Power ACM or similar architectures.

Example of Content Distribution and Licensing Control Using a CDN

Figure 2:
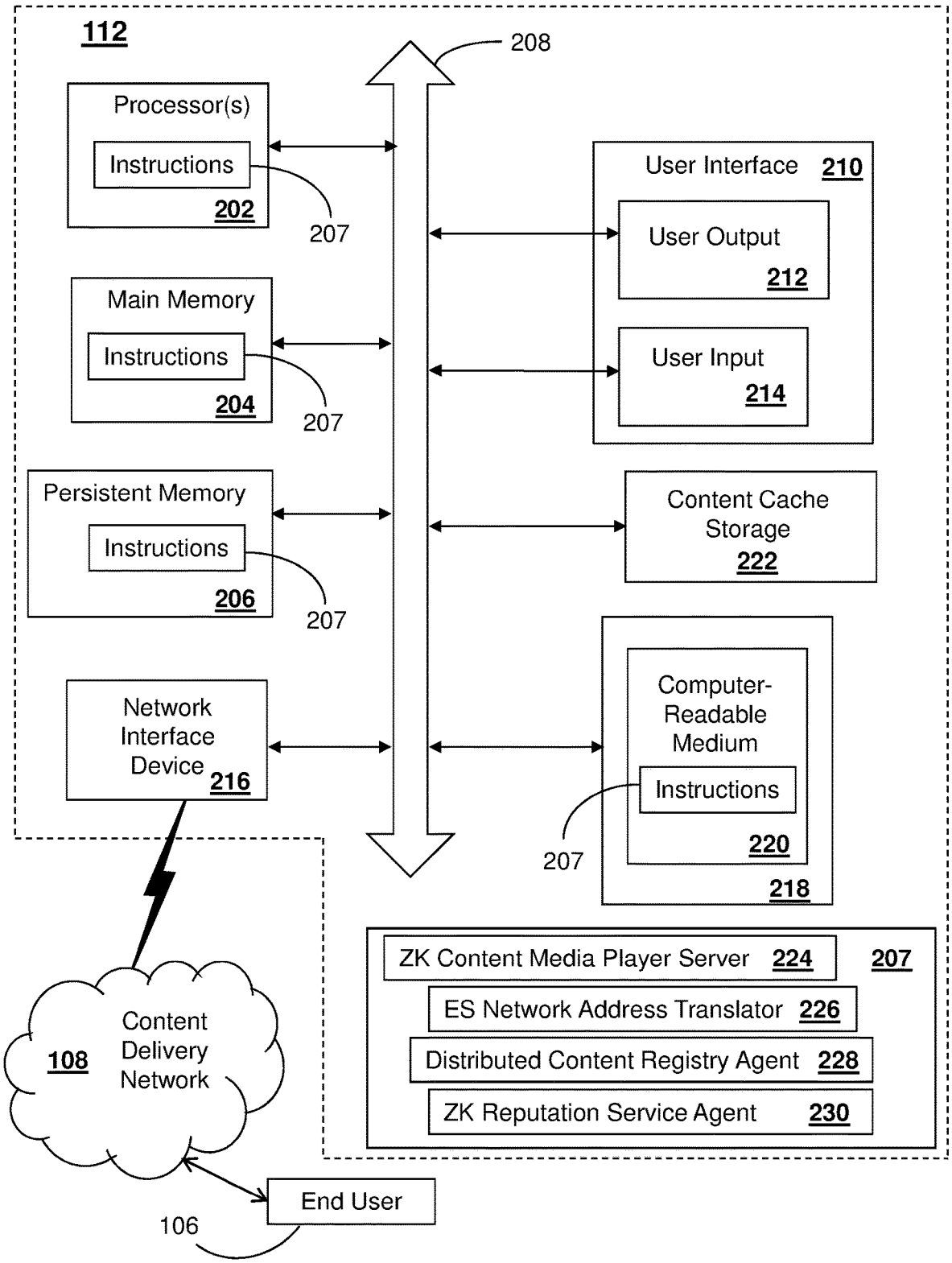
FIG. 2 is a block diagram illustrating a more detailed view of the example edge server computing node, which in various embodiments may also be referred to as a zero knowledge cache node, in the content delivery network illustrated in FIG. 1, according to an embodiment of the present invention.

FIG. 2 illustrates an example of the edge server node (or also referred to as edge node or as cache node) 112 in the content delivery network 108 as shown in FIG. 1. This simplified example is not intended to suggest any limitation as to the scope of use or function of various embodiments of the invention described herein. In edge node 112 there is a computer system/server, which is operational with numerous other general purpose or special purpose computing system environments or configurations. Examples of well-known computing systems, environments, and/or configurations that may be suitable for use with computer system/server include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

The computer system/server may be described in the general context of computer system-executable instructions, such as program modules, being executed by a computer system. Generally, program modules may include routines, programs, objects, components, logic, data structures, and so on that perform particular tasks or implement particular abstract data types. Computer system/server may be practiced in distributed cloud computing environments where tasks are performed by remote processing devices that are linked through a communications network. In a distributed cloud computing environment, program modules may be located in both local and remote computer system storage media including memory storage devices.

In this example, a content provider 104 is a publisher of content, such as music, video, movies, software, games, or a combination thereof.

The content provider 104 is communicatively coupled to the content hosting site or origin server 110. The content delivery service is provided, according to the example, from the content provider 104 and origin server 110 to the end user 106 via the CDN 108. The CDN 108 may be implemented in a cloud computing environment.

The end user device 106 responds to an end user or consumer command to locate a particular content available on the network 102. The end user device 106 contacts a distributed registry server (not shown) that advertises via a publicized distributed registry available content on the network 102. The distributed registry server advertises various features and conditions of accessing for downloading various copies of the content available on the network 102. For example, the particular content may be available directly from the content provider at the origin server 110. Alternatively, the distributed registry advertises that the particular content is available at the edge server 112. The content provider 104 has distributed and cached copies of the particular content at various points in the network 102 to help reduce latency and improve throughput in delivering content to various end-users across the network 102.

The content provider 104, according to various embodiments, can access a first API at the edge server 112 to enter into a smart contract or other similar arrangement with the operator of the edge server 112 to make available the particular content at the edge server 112. The distributed registry advertises the IP address and other contact information of the edge server 112 and the pricing arrangement available to content providers to cache their content at the edge server 112. For example, the content provider 104, using the edge server's IP address and other contact information publicized by the distributed registry, contacts the edge server 112 and accesses the first API at the edge server 112. The content provider, via the first API, enters into the smart contract with the edge server 112 operator to split the revenue from distributing content at, for example, 5% of the price of the distributed content paid by an end user to be paid to the operator of the edge server 112 for content that is cached at the edge server 112 and served to the end user.

An end-user could select to download a copy of the content from the content provider 104 directly from the hosting origin server 110 at a first latency and at a first price, while alternatively the end user can select to download a copy of the same content from the edge server 112 in the content delivery network 108 at a second lower latency (faster delivery) and at a second higher price. Typically, the second latency would be much lower than the first latency due to the edge server 112 being located proximate to the end user 106. The second price offered to the end-user 106 may be set at 5% higher than the price of downloading the content directly from the content provider 104 via the origin server 110. The end-user 106 would have the choice to pay 5% more to have a much better download experience in downloading the content from the edge server 112 as compared to downloading the content from the origin server 110. In this way, the marketplace for the content can be served with alternative options for accessing and downloading the content at different download experiences and prices. Other parameters for accessing and downloading the content may be also advertised by the distributed registry and be part of the end-user's decision process for selecting the source of the particular content.

Continuing with the present example, the end-user 106 accesses the distributed registry information and decides to use the edge server 112 to download the particular content for consumption by the end-user. The end-user device 106, using the edge server's IP address and other contact information publicized by the distributed registry, contacts the edge server 112 and accesses a second API at the edge server 112 for end-users to establish a communication session for downloading content.

The end-user 106 establishes a communication session with the edge server 112 as part of the content-purchase commercial transaction between the end user device 106 and the edge server 112 acting as the content delivery service provider. This communication session can be based on standard Internet web protocols.

As part of the web-based interaction, the user via the user device 106 makes the selection of the content to license or purchase. Typically, in most systems the user provides personal and financial information, and agrees to the conditions of purchase. However, in this new and novel content distribution system, unlike the prior art systems, the user achieves a greater level of privacy and is able to anonymously download and access the content. Payment can be privately received via the edge server 112.

In one example, a subscription model for payment collection is implemented via the edge server 112 such that a download of the content is registered by the edge server 112 against the content provider subscription. The identity of the end user can remain anonymous as to the actual particular content being accessed and downloaded from the edge server 112. The edge server 112, and accordingly the CDN 108, does not store information about the content delivery session with the end user 106, the identity of the end user 106, or an IP address of the end user device 106. In another example, payment using cryptocurrency and a zero knowledge protocol between the end user 106 and the edge server 112 can additionally ensure the user's privacy. Cryptocurrency, such as bitcoin, may be used. The content delivery service provider and edge server 112 could obtain payment authorization as a peer-to-peer transaction from the user device 106 without use of an intermediary bank using a public payment ledger. The user-device 106 can include, for example, information processing systems such as desktop computers, laptop computers, servers, wireless devices (e.g., mobile phones, tablets, personal digital assistants, etc.), and the like.

It is also assumed in the current example that the content delivery service provider and edge server 112 have made available for downloaded at least a portion of a content media player application to a user device 106 based on standard web protocols. The content media player application 106 may also be signed by the service provider. This allows end users to verify that the content media player was downloaded from an authorized source. The content distribution mechanism requires that the edge server 112 receives an assurance from the content media player application that it has successfully executed on the user device 106. In one embodiment, it may assign a unique application ID to the downloaded content media player application and the user device 206 stores it for later application license verification.

The overall licensing flow starts at the content provider 104. The content provider 104 encrypts the content using an encryption key locally generated. In an alternative approach, the key instead of being locally generated may be sent to the content provider 104 from a third party authentication authority, such as a clearinghouse (not shown). The content provider 104 encrypts the content to create encrypted content with usage conditions. The encrypted content object may be cached at the edge server 112 along with a copy of the content media player application that is signed by the content provider 104. The content can then be distributed to end user 106 as part of a streaming service or the entire content can be delivered at once, such as a game, a video, software, or music purchase and download. The content provider 104 may sign the encrypted content to allow users to verify that the encrypted content was sourced from an authorized distribution source.

In one example, the content provider 104 distributes, from the content hosting origin server 110, the encrypted content with usage conditions to be cached at one or more content delivery service provider edge servers 112 in the content delivery network 108 (if the service provider is not hosting their own content, as is the case with Netflix, Amazon, and many other content delivery service providers). The content provider 104 can send the encrypted content with usage conditions and the signed content media player application to the edge server(s) 112. For each content purchase/license transaction with an end user, the content provider 104 receives a verifiable message from the end user device 106 (relayed via the edge server 112) to confirm/verify that the content media player application has successfully executed with the particular content.

After entering into a three-way content-purchase-license transaction between 1) the user at the user device 106, 2) the content delivery service provider controlling the edge server 112, and 3) the content provider 104, the content delivery service provider via the edge server 112 creates and transfers to the user device 106 the purchased-licensed encrypted content object and optionally also makes available to the end user device a signed copy of the content media player application. According to various embodiments, in this optional step at least a portion of the content media player application with digital rights management (DRM) may be sent from the edge server 112 to the end user device 106.

The content media player is executed on the end user device 106 using a zero-knowledge protocol to ensure the privacy of the user. The process may include another optional step in which the service provider via the edge server 112 receives cryptocurrency from the end user device 106. This is as consideration or payment for the content.

According to the present example, after receiving the encrypted content with usage conditions, the end user device 106 using the content media player decrypts the encrypted content and plays the content for the end user and consumer. The end user device 106 receives a verification message from the content media player to confirm that the content media player has completed playing at least a portion of the received content. The end user device 106 transmits a copy of the verification message to the edge server 112. Likewise, according to various embodiments, the edge server 112 can transmit a copy of the verification message to the hosting origin server 110 and thereby to the content provider 104.

The content can be verified with a verification message generated by the executing content media player to confirm that the content is being, or has been, played by the content media player. The verification message can be generated by the content media player at one or more different portions of the overall content being delivered and played at the end user device 106.

For example, one verification message can be generated at the very completion of download, and optional play, of the entire content. Alternatively, a verification message can be generated at incremental portions (e.g., chunks) of the content being downloaded, and optionally played, by the content media player. A verification message could even be generated at each packet of downloaded content being processed at the content media player.

While verification messages can be generated periodically the end user device 106 does not necessarily need to verify the verification message every time generated. Additionally, the end user device 106 does not necessarily transmit each verification message to the edge server 112.

Similarly, the edge server 112 does not necessarily need to verify every verification message received from the end user device 106. Additionally, the edge server 112 does not necessarily need to transmit each verification message to the origin server 110 and the content provider 104.

A verification message can be verified mathematically at a local information processing system that receives the verification message, e.g., at the end user device 106, at the edge server 112, and at the origin server 110. Alternatively, the verification message can be verified by the local information processing system transmitting a copy of the verification message to a remote verifying authority across the network 102. The verifying authority would respond with a confirmation message that either affirmatively confirms verification or fails verification.

As long as the verification message(s) continue to be affirmatively verified, the local information processing system recognizes authorized execution of the content media player with the verified content being played. If at any point verification fails, the local information processing system can take appropriate action based on the end user conditions for the particular content and the smart contract entered into by the end user.

Referring again to FIG. 2, the edge server (or also referred to as the edge server node) 112 is shown in more detail than that shown in the content delivery network 108 in FIG. 1. The edge server node 112 comprises one or more processors 202 communicatively coupled with a main memory 204 and with a persistent memory 206.

Figure 4:
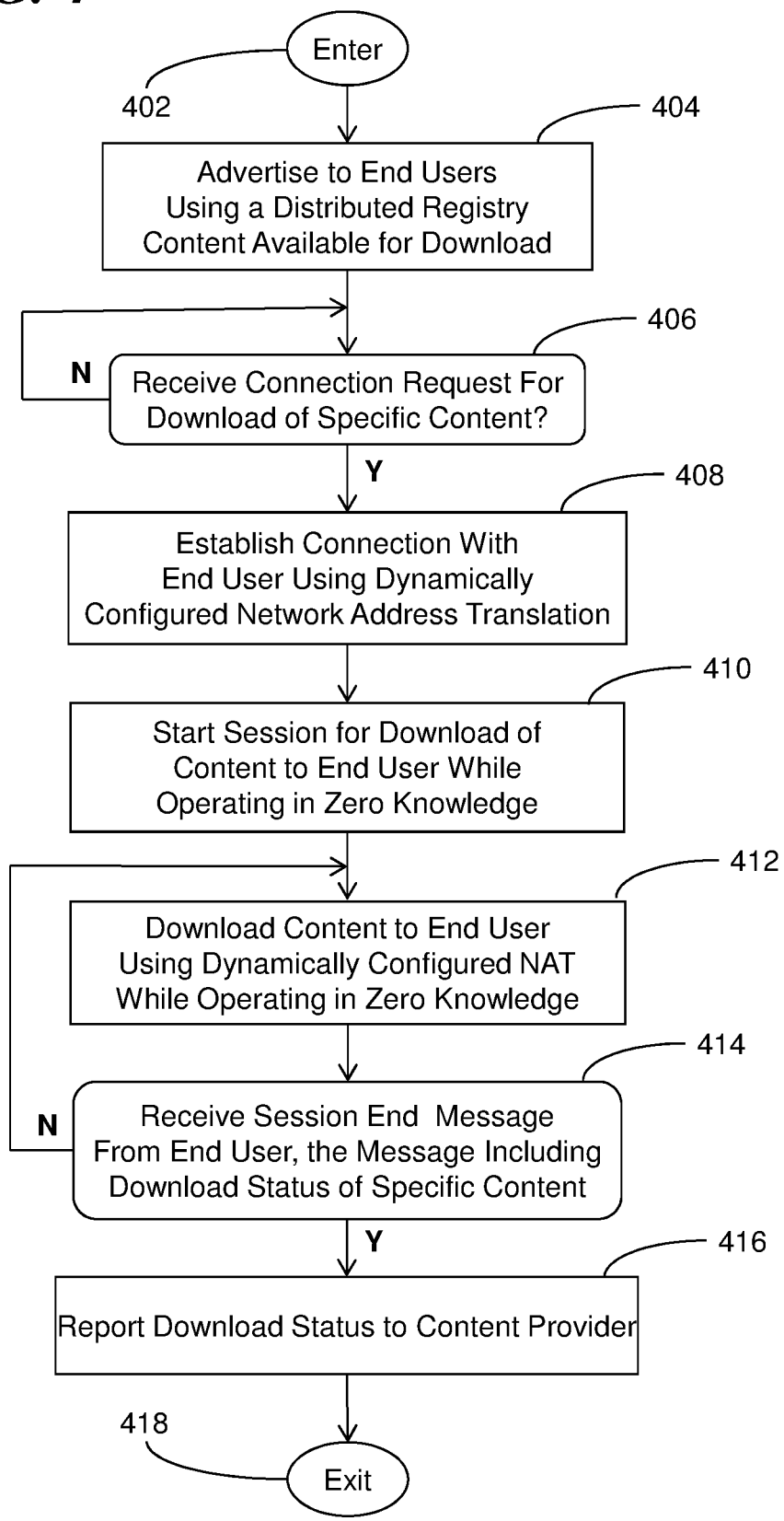
FIG. 4 is a flow diagram illustrating an example operational sequence performed with the zero knowledge cache node shown in FIG. 2 and the end user device shown in FIG. 3, according to an embodiment of the present invention.

System memory 204, in one embodiment, implements the memory block diagram of FIG. 2 and the flow diagram of FIG. 4. The system memory 204 can include computer system readable media in the form of volatile memory, such as random access memory (RAM) and/or cache memory. The computer system/server may further include other removable/non-removable, volatile/non-volatile computer system storage media. By way of example only, a persistent memory storage system 206 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 208 by one or more data media interfaces. As will be further depicted and described below, persistent memory 206 may include at least one program product having a set (e.g., at least one) of program modules that are configured to carry out the functions of various embodiments of the invention.

Program/utility, having a set (at least one) of program modules, may be stored in persistent memory 206 by way of example, and not limitation, as well as an operating system, one or more application programs, other program modules, and program data. Each of the operating system, one or more application programs, other program modules, and program data or some combination thereof, may include an implementation of a networking environment. Program modules generally carry out the functions and/or methodologies of various embodiments of the invention as described herein.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

The one or more processors 202 are also communicatively coupled with a reader 218 of computer readable medium 220. The computer system/server of the edge node 112 can typically include a variety of computer system readable media 220. Such media may be any available media that is accessible by computer system/server, and it includes both volatile and non-volatile media, removable and non-removable media.

A bus architecture 208 facilitates communication between the various system components in the edge server 112. The bus 208 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Instructions 207 can be at least partially stored in the computer readable medium 220, the main memory 204, the persistent memory 206, and internal memory cache in the one or more processors 202. Instructions 207 can comprise, for example, computer program software, configuration parameters, and data, used by the one or more processors 202 to execute instructions of the computer program software. The processor 202 executes the instructions, according to various embodiments, and in response to executing the instructions performs features and functions of the edge server 112, as will be discussed in more detail below.

Content cache memory storage 222 is communicatively coupled with the one or more processors 202 and can store at least a portion of content, and related data, for distribution in the content delivery network 108. At least a portion of the content may be stored in an encrypted form that would require a cryptographic key to decrypt and render the content usable by an executing content media player. According to various embodiments, content is stored in the cache memory storage 222 and can be at least partially downloaded to the end user device 106 for execution of the content media player.

The processor 202 is communicatively coupled with a user interface 210. The user interface 210 comprises a user output interface 212 and a user input interface 214. Examples of elements of the user output interface 212 can include a display, a speaker, one or more indicator lights, one or more transducers that generate audible indicators, and a haptic signal generator. Examples of elements of the user input interface 214 can include a keyboard, a keypad, a mouse, a track pad, a touch pad, a microphone that receives audio signals. The received audio signals, for example, can be converted to electronic digital representation and stored in memory, and optionally can be used with voice recognition software executed by the processor 202 to receive user input data and commands.

The processor 202 is communicatively coupled with one or more network interface devices 216. The network interface device 216 is communicatively coupled with the content delivery network 108. The network interface device 216 can communicate with one or more networks such as a local area network (LAN), a general wide area network (WAN), and/or a public network (e.g., the Internet). The end user device 106 is also communicatively coupled with the content delivery network 108 as shown. In this way, the end-user device 106 can communicate with the edge server 112 via the network interface device 216.

Still yet, computer system/server 402 can communicate with one or more networks such as a local area network (LAN), a general wide area network (WAN), and/or a public network (e.g., the Internet) via network adapter 426. As depicted, network adapter 426 communicates with the other components of computer system/server 402 via bus 408.

The instructions 207 include instructions for performing features and functions of a zero knowledge content media player server 224. The zero knowledge content media player server 224 implements the server side application executing on the edge server 112 that communicates and interoperates with the content media player at the end user device 106.

The instructions 207, according to the present example, include an edge server network address translator 226. The edge server network address translator 226 operates in the edge server 112 to dynamically configure and translate Internet protocol (IP) addresses that are used to communicate with the end user device 106. A similar but complementary network address translator component resides in the end user device 106 to dynamically configure and translate IP addresses used to communicate with the edge server 112. In this way, the edge server 112 and the end-user device 106 can anonymously communicate with each other across the network 102 while preventing other devices from "sniffing"

the communications on the network 102 and from the IP addresses used being able to easily identify the end user device 106.

The instructions 207 according to the present example, include a distributed content registry agent 228. The distributed content registry agent 228 provides a mechanism at the edge server 112 for advertising the various content and content delivery services available from the edge server 112. The distributed content registry agent 228 allows peer to peer communications with other information processing systems on the network 102 such that other information processing systems may access and connect with the content delivery services and the content available at the edge server 112.

The instructions 207, according to various embodiments, can include a zero knowledge reputation service agent 230. The zero knowledge reputation service agent 230 operates at the edge server 112 in communication with one or more other reputation service agents at respective one or more information processing systems on the network 102, such that the edge server 112 can determine from information accessed through the zero knowledge reputation service agent 230 whether content received from a particular content provider is acceptable for distribution by the edge server 112. For example, the edge server and accordingly the CDN 108 service provider can be assured of a reasonable exclusion of, for example, prurient or even legal content without any specific knowledge of the identity of any specific piece of cached content. The reputation service would enable exclusion of such content on a per item or a collective per provider basis based on feedback from the content consumers provided in zero knowledge.

The instructions 207 and the program/utility therein, having a set (at least one) of program modules, may be stored in memory 204 by way of example, and not limitation, as well as an operating system, one or more application programs, other program modules, and program data. Each of the operating system, one or more application programs, other program modules, and program data or some combination thereof, may include an implementation of a networking environment. Program modules generally carry out the functions and/or methodologies of various embodiments of the invention as described herein.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

End User Device and Content Media Player

Figure 3:
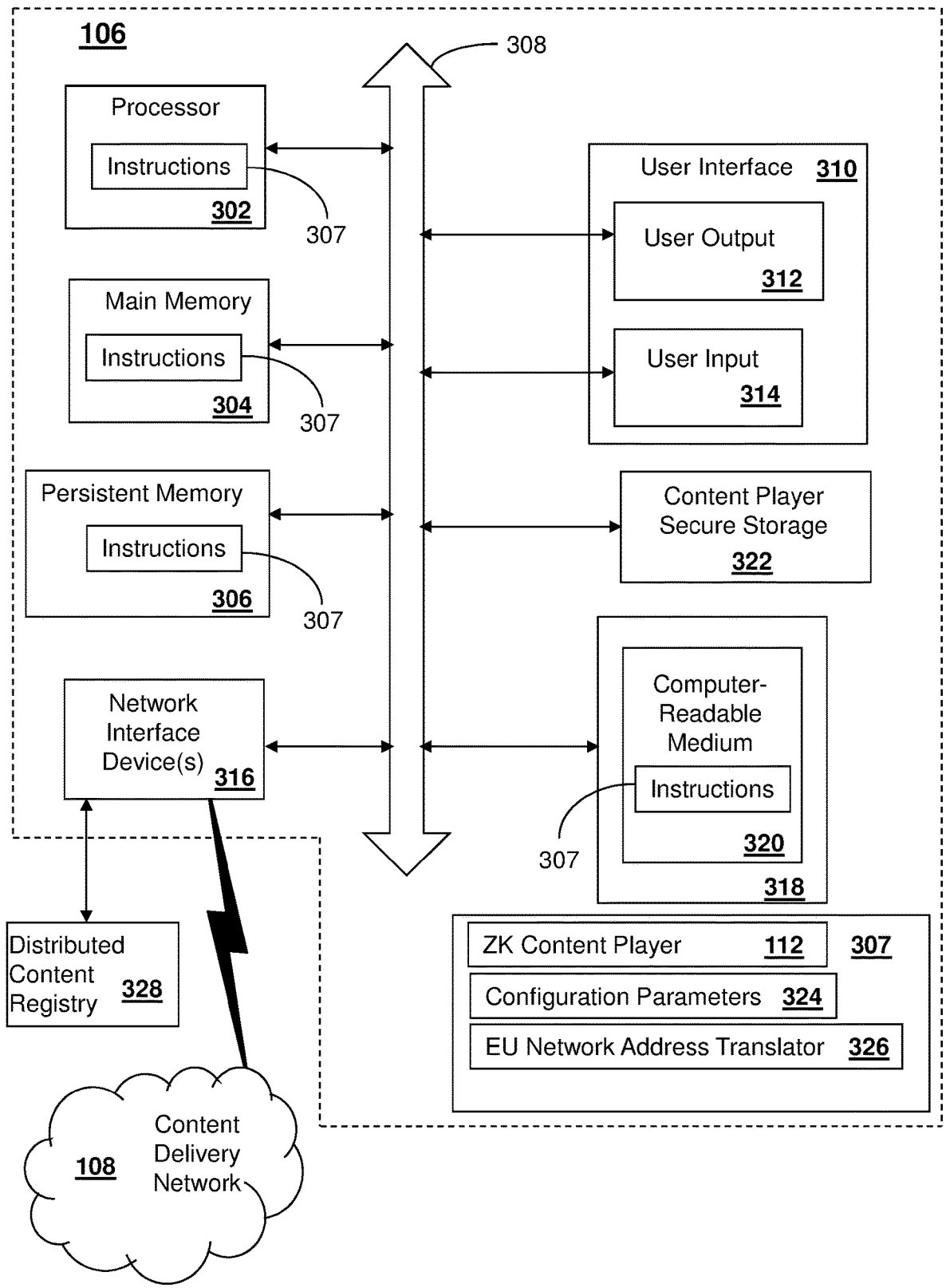
FIG. 3 is a block diagram illustrating an example of the end user device, which in various embodiments may also be referred to as a zero knowledge player, interoperating with the content delivery network illustrated in FIG. 1, according to an example embodiment of the present invention.

Referring to FIG. 3, a more detailed view of the end-user device 106 is shown. One or more processors 302 are communicatively coupled with main memory 304 and persistent memory 306. A bus architecture 308 communicatively couples the processor 302 with other components of the end user device 106.

A bus architecture 308 facilitates communication between the various system components in the end user device 106. The bus 308 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

The processor 302 is communicatively coupled with one or more network interface devices 316. The network interface device 316 is communicatively coupled with the content delivery network 108. The network interface device 316 can communicate with one or more networks such as a local area network (LAN), a general wide area network (WAN), and/or a public network (e.g., the Internet). The edge server 112 is also communicatively coupled with the content delivery network 108. The network interface device 316 is communicatively coupled with the distributed content registry agent 328. The end-user device 106 can communicate with the edge server 112 via the network interface device 316.

The processor 302 is communicatively coupled with a user interface 310. The user interface 310 comprises a user output interface 312 and a user input interface 314. Examples of elements of the user output interface 312 can include a display, a speaker, one or more indicator lights, one or more transducers that generate audible indicators, and a haptic signal generator. Examples of elements of the user input interface 314 can include a keyboard, a keypad, a mouse, a track pad, a touch pad, a microphone that receives audio signals. The received audio signals, for example, can be converted to electronic digital representation and stored in memory, and optionally can be used with voice recognition software executed by the processor 302 to receive user input data and commands.

The instructions 307 include instructions for performing features and functions of a zero knowledge content media player 323. The zero knowledge content media player at the end user device 106, according to the present example, communicates and interoperates with the zero knowledge content media player server 224 implemented as a server side application executing on the edge server 112.

The instructions 307, according to the present example, include configuration parameters for use by the zero knowledge content media player 323 and for use by other components of the end user device 106.

The instructions 307, according to the present example, include instructions for performing features and functions of an end user network address translator 326. The end user network address translator 326 operates in the end user device 106 to dynamically configure and translate Internet protocol (IP) addresses that are used to communicate with the edge server 112. A similar but complementary network address translator component resides in the edge server 112 to dynamically configure and translate IP addresses used to communicate with the end user device 106. In this way, the edge server 112 and the end user device 106 can anonymously communicate with each other across the network 102 while preventing other devices from "sniffing" the communications on the network 102 and from the IP addresses used being able to easily identify the end user device 106.

FIG. 4 shows an example operational sequence performed with the zero knowledge edge server node 112 and the end user device 106, according to an embodiment of the present invention. The operational sequence is entered, at step 402, then the edge server 112 advertises, at step 404, using a distributed content registry agent 228, content available for download by end users 106 that are communicatively coupled with the content delivery network 108. The edge server 112 advertises that the content can be downloaded from the content delivery network 108 operating in zero knowledge. The edge server 112 continuously checks whether it has received, at step 406, a connection request for download of specific content from an end user device 106. While the edge server 112 has not received a connection request, at step 406, it will continue checking. When the edge server 112, at step 406, receives a specific content request the edge server 112 establishes a connection, at step 408, with the specific end user device 106 using a dynamically configured network address translation protocol.

The edge server network address translator 226 and the end user network address translator 326 interoperate to provide IP addresses that can be used by the edge server 112 and the end-user device 106 to communicate with each other. Additionally, the dynamically configured network address translation prevents other devices on the network 102 from "sniffing" the communications between the edge server 112 and the end-user device 106 and from the IP addresses used being able to easily identify the end-user device 106.

The edge server 112 starts, at step 410, a session for downloading content to the end user device 106 while operating in zero knowledge. According to the present example, a chunk of content is downloaded, at step 412, from the edge server 112 to the end-user device 106 using dynamically configured network address translation protocol while operating in zero knowledge.

While the edge server 112 does not detect reception of a session and message from the end user device 106, at step 414, the edge server 112 continues to download content to the end user device 106. When the edge server 112 receives a session and message from the end user device 106, at step 414, the edge server 112 determines that the content has been completely downloaded and executed at the end user device 106. The session ended message from the end user device 106 can include a download status of the specific content and whether the end-user device 106 has completed execution of the content. After reception of a session and message, at step 414, the edge server 112 reports, at step 416, the content download status to the content provider 104. The operational sequence is then exited, at step 418.

Cloud Computer Environment

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 5:
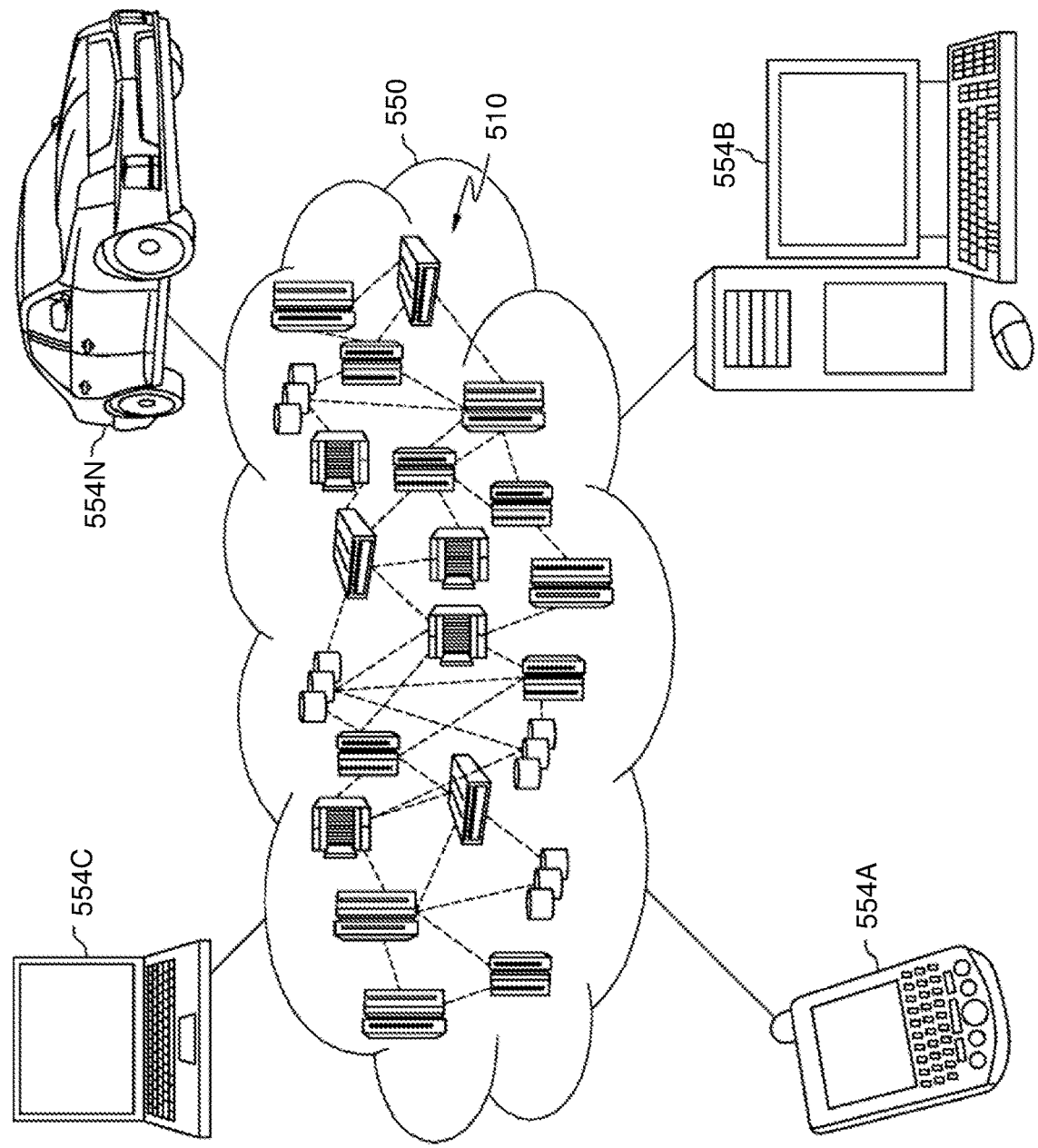
FIG. 5 depicts a cloud computing environment according to an embodiment of the present invention.

Referring now to FIG. 5, illustrative cloud computing environment 550 is depicted. As shown, cloud computing environment 550 comprises one or more cloud computing nodes 510 with which local computing devices used by cloud consumers, such as, for example, personal digital assistant (PDA) or cellular telephone 554A, desktop computer 554B, laptop computer 554C, and/or automobile computer system 554N may communicate. Nodes 510 may communicate with one another. They may be grouped (not shown) physically or virtually, in one or more networks, such as Private, Community, Public, or Hybrid clouds as described hereinabove, or a combination thereof. This allows cloud computing environment 550 to offer infrastructure, platforms and/or software as services for which a cloud consumer does not need to maintain resources on a local computing device. It is understood that the types of computing devices 554A-N shown in FIG. 5 are intended to be illustrative only and that computing nodes 510 and cloud computing environment 550 can communicate with any type of computerized device over any type of network and/or network addressable connection (e.g., using a web browser).

Referring now to FIG. 6, a set of functional abstraction layers provided by cloud computing environment 550 is shown. It should be understood in advance that the components, layers, and functions shown in FIG. 6 are intended to be illustrative only and embodiments of the invention are not limited thereto. As depicted, the following layers and corresponding functions are provided:

Hardware and software layer 660 includes hardware and software components. Examples of hardware components include: mainframes 661; RISC (Reduced Instruction Set Computer) architecture based servers 662; servers 663; blade servers 664; storage devices 665; and networks and networking components 666. In some embodiments, software components include network application server software 667 and database software 668.

Virtualization layer 670 provides an abstraction layer from which the following examples of virtual entities may be provided: virtual servers 671; virtual storage 672; virtual networks 673, including virtual private networks; virtual applications and operating systems 674; and virtual clients 675.

In one example, management layer 680 may provide the functions described below. Resource provisioning 681 provides dynamic procurement of computing resources and other resources that are utilized to perform tasks within the cloud computing environment. Metering and Pricing 682 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 683 provides access to the cloud computing environment for consumers and system administrators. Service level management 684 provides cloud computing resource allocation and management such that required service levels are met. Service Level Agreement (SLA) planning and fulfillment 685 provide pre-arrangement for, and procurement of, cloud computing resources for which a future requirement is anticipated in accordance with an SLA.

Workloads layer 690 provides examples of functionality for which the cloud computing environment may be utilized. Examples of workloads and functions which may be provided from this layer include: mapping and navigation 691; software development and lifecycle management 692; virtual classroom education delivery 693; data analytics processing 694; transaction processing 695; and for delivering services, including content delivery services, from an edge server 112 operating in zero knowledge to one or more end user devices 106 to ensure content control by content providers (i.e. reduce piracy) and to ensure privacy by content users 696.

Non-Limiting Examples

The present invention may comprise a system, a method, and/or a computer program product. The computer program product may include a computer readable storage medium (or media) having computer readable program instructions thereon for causing a processor to carry out aspects of the present invention.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer readable program instructions described herein can be downloaded to respective computing/processing devices from a computer readable storage medium or to an external computer or external storage device via a network or networks, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described herein with reference to flow diagram illustrations and/or block diagrams of methods, apparatus (systems), and computer program products according to embodiments of the invention. It will be understood that each block of the flow diagram illustrations and/or block functional diagrams, and combinations of blocks in the flow diagram illustrations and/or block functional diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flow diagrams and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flow diagram and/or functional block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flow diagram and/or block diagram block or blocks.

The flow diagram and block diagrams in the Figures illustrate the architecture, functionality, and operation of possible implementations of systems, methods, and computer program products according to various embodiments of the present invention. In this regard, each block in a flow diagram or block diagram may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flow diagram illustration, and combinations of blocks in the block diagrams and/or flow diagram illustration, can be implemented by special purpose hardware-based systems that perform the specified functions or acts or carry out combinations of special purpose hardware and computer instructions.

While the computer readable storage medium is shown in an example embodiment to be a single medium, the term "computer readable storage medium" should be taken to include a single medium or multiple media (e.g., a centralized or distributed database, and/or associated caches and servers) that store the one or more sets of instructions. The term "computer-readable storage medium" shall also be taken to include any non-transitory medium that is capable of storing or encoding a set of instructions for execution by the machine and that cause the machine to perform any one or more of the methods of the subject disclosure.

The term "computer-readable storage medium" shall accordingly be taken to include, but not be limited to: solid-state memories such as a memory card or other package that houses one or more read-only (non-volatile) memories, random access memories, or other re-writable (volatile) memories, a magneto-optical or optical medium such as a disk or tape, or other tangible media which can be used to store information. Accordingly, the disclosure is considered to include any one or more of a computer-readable storage medium, as listed herein and including art-recognized equivalents and successor media, in which the software implementations herein are stored.

Although the present specification may describe components and functions implemented in the embodiments with reference to particular standards and protocols, the disclosure is not limited to such standards and protocols. Each of the standards represents examples of the state of the art. Such standards are from time-to-time superseded by faster or more efficient equivalents having essentially the same functions.

The illustrations of examples described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Although specific embodiments have been illustrated and described herein, it should be appreciated that any arrangement calculated to achieve the same purpose may be substituted for the specific embodiments shown. The examples herein are intended to cover any and all adaptations or variations of various embodiments. Combinations of the above embodiments, and other embodiments not specifically described herein, are contemplated herein.

The Abstract is provided with the understanding that it is not intended be used to interpret or limit the scope or meaning of the claims. In addition, in the foregoing Detailed Description, various features are grouped together in a single example embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

Although only one processor is illustrated for an information processing system, information processing systems with multiple CPUs or processors can be used equally effectively. Various embodiments of the present disclosure can further incorporate interfaces that each includes separate, fully programmed microprocessors that are used to off-load processing from the processor. An operating system (not shown) included in main memory for the information processing system may be a suitable multitasking and/or multiprocessing operating system, such as, but not limited to, any of the Linux, UNIX, Windows, and Windows Server based operating systems. Various embodiments of the present disclosure are able to use any other suitable operating system. Various embodiments of the present disclosure utilize architectures, such as an object oriented framework mechanism, that allows instructions of the components of operating system (not shown) to be executed on any processor located within the information processing system. Various embodiments of the present disclosure are able to be adapted to work with any data communications connections including present day analog and/or digital techniques or via a future networking mechanism.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. The term "another", as used herein, is defined as at least a second or more. The terms "including" and "having," as used herein, are defined as comprising (i.e., open language). The term "coupled," as used herein, is defined as "connected," although not necessarily directly, and not necessarily mechanically. "Communicatively coupled" refers to coupling of components such that these components are able to communicate with one another through, for example, wired, wireless or other communications media. The terms "communicatively coupled" or "communicatively coupling" include, but are not limited to, communicating electronic control signals by which one element may direct or control another. The term "configured to" describes hardware, software or a combination of hardware and software that is adapted to, set up, arranged, built, composed, constructed, designed or that has any combination of these characteristics to carry out a given function. The term "adapted to" describes hardware, software or a combination of hardware and software that is capable of, able to accommodate, to make, or that is suitable to carry out a given function.

The terms "controller", "computer", "processor", "server", "client", "computer system", "computing system", "personal computing system", "processing system", or "information processing system", describe examples of a suitably configured processing system adapted to implement one or more embodiments herein. Any suitably configured processing system is similarly able to be used by embodiments herein, for example and not for limitation, a personal computer, a laptop personal computer (laptop PC), a tablet computer, a smart phone, a mobile phone, a wireless communication device, a personal digital assistant, a workstation, and the like. A processing system may include one or more processing systems or processors. A processing system can be realized in a centralized fashion in one processing system or in a distributed fashion where different elements are spread across several interconnected processing systems.

The corresponding structures, materials, acts, and equivalents of all means or step plus function elements in the claims below are intended to include any structure, material, or act for performing the function in combination with other claimed elements as specifically claimed.

The description of the present application has been presented for purposes of illustration and description, but is not intended to be exhaustive or limited to the invention in the form disclosed. Many modifications and variations will be apparent to those of ordinary skill in the art without departing from the scope of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A computer-based method with a zero-knowledge server node in a content delivery network for delivering content from the zero-knowledge server node to an end user device, ensuring content control by a content provider server while also ensuring privacy, with respect to the content delivery network, of an end user using at least a portion of a content media player application at the end user device to receive the content, the method comprising:

accessing, by the content provider server, a first API at the zero-knowledge server node;

entering into, by the content provider server, a smart contract with the zero-knowledge server node, in response to accessing the first API;

making available by the zero-knowledge server node, a particular content for download to end user devices in response to entering into the smart contract;

accessing, by an end user device communicatively coupled with the content delivery network, a second API at the zero-knowledge server node;

entering into, by the end user device, a three-way smart contract with the content provider server, and the zero-knowledge server node, in response to accessing the second API;

initiating, by the end user device, a content-purchase commercial transaction between the end user device, the content provider server, and the zero-knowledge server node, and in response to the entering of the three-way smart contract, establishing by the zero-knowledge server node, a communication session over the content delivery network using a zero-knowledge protocol between the end user device and the zero-knowledge server node operating in zero knowledge;

anonymously, with respect to the content delivery network, the zero-knowledge server node, and the content provider server, downloading via the established communication session the particular content from the zero-knowledge server node to the end user device, the zero-knowledge server node operating in zero knowledge operates without storing a record of which content was delivered to whom at any given time by avoiding storing information about:
 a content delivery session with an end user of the end user device over the established communication session,
 an identity of the end user of the end user device, and
 an IP address of the end user device;

accessing, by the end user device, the particular content using at least a portion of a content media player application downloaded from the zero-knowledge server node to the end user device in a communication session over the content delivery network using a zero-knowledge protocol between the end user device and the zero-knowledge server node operating in zero knowledge;

registering, by the zero-knowledge server node, the download of the particular content against the smart contract with the content provider, while maintaining identity of the end user device anonymous with respect to the content delivery network, the operator of the zero-knowledge server node, and the content provider server;

receiving, at the content provider server, via a relay communication through the zero-knowledge server node operating in zero knowledge, a cryptographically verifiable response message from the end user device;

determining, by the content provider server, whether the at least the portion of the content media player application has successfully executed with the particular content at the end user device based on the cryptographically verifiable response message; and completing, while the zero-knowledge server node operating in zero knowledge, a cryptocurrency smart contract transaction associated with the three-way smart contract, based on the content provider server receiving the cryptographically verifiable response message from the end user device and therefrom determining the successful execution, at the end user device, of the at least the portion of the content media player application with the particular content.

2. The computer-based method of claim 1, wherein the zero-knowledge server node comprises a zero-knowledge edge server node in a zero-knowledge content delivery network, the zero-knowledge edge server node storing the content near the edge of the zero-knowledge content delivery network and delivering the content on demand to the end user device while operating in zero knowledge.

3. The computer-based method of claim 1, wherein the cryptographically verifiable response message including a report of content usage information of the content by the content media player application and a cryptographically verifiable proof of integrity of the content media player, the content provider determining from the report and the cryptographically verifiable proof of integrity, and without personally identifiable information of the end user and the end user device, the successful execution, at the end user device, of the at least the portion of the content media player application with the particular content.

4. The computer-based method of claim 1, wherein the content comprises at least one of music, a video, software, a game, or a combination thereof.

5. The computer-based method of claim 1, further including:
 receiving, with the zero-knowledge server node operating in zero knowledge, a payment from the user device as payment for at least delivering the content to the user device; and
 sending, with the zero-knowledge server node operating in zero knowledge, a portion of the received payment to a content provider that provided the content to the zero-knowledge server node, without identifying the end user device.

6. The computer-based method of claim 5, wherein the receiving the payment further includes receiving a cryptocurrency as payment.

7. The computer-based method of claim 1, wherein the zero-knowledge verifiable computing comprises a succinct computational integrity and privacy (SCIP) technique.

8. The computer-based method of claim 1, wherein the zero-knowledge verifiable computing comprises a zero-knowledge Succinct non-interactive argument of knowledge (zk-snark) technique.

9. The computer-based method of claim 1, wherein the zero-knowledge verifiable computing comprises a probabilistically checkable proof (PCP) technique.

10. The computer-based method of claim 1, wherein the portion of the content media player application comprises a wrapper application that enforces digital rights management onto a preexisting application or web browser on the end user device; and the method further comprising:
 downloading, while in the communication session with the zero-knowledge server node operating in zero knowledge, the at least the portion of a content media player application and at least a portion of the particular content from the zero-knowledge server node and destined for reception by the end user device, the at least a portion of the content media player application including digital rights management technology using zero-knowledge verifiable computing to enforce usage conditions on the particular content received at the end user device.

11. The computer-based method of claim 1, wherein the response message received from the end user device includes indication of whether the content media player application is using at least one of trusted computing, secure boot attestation, or a combination thereof.

12. An information processing system for delivering content from a zero-knowledge edge server node in a content delivery network to an end user device for use or consumption of the content by an end user of the end user device, ensuring content control by a provider of the content while ensuring privacy, with respect to the content delivery network, of an end user or consumer of the content using the end user device, the information processing system comprising:

the zero-knowledge edge server node in the content delivery network;
the end user device; and
a content provider server;
wherein the zero-knowledge edge server, the end user device, and the content provider server each comprising: one or more processors; and
a non-transitory computer readable medium coupled to the one or more processors, the non-transitory computer readable medium comprising instructions, executable by the one or more processors, that cause the information processing system to perform the operations of:
storing, by the zero-knowledge edge server node, content in a memory of the zero-knowledge edge server node;
accessing, by the content provider server, a first AN at the zero-knowledge edge server node;
entering into, by the content provider server, a smart contract with the zero-knowledge edge server node, in response to accessing the first API;
making available by the zero-knowledge edge server node, a particular content for download by end users devices, in response to entering into the smart contract;
accessing, by an end user device communicatively coupled with the content delivery network, a second API at the zero-knowledge edge server node thereby executing, by the end user device, a three-way smart contract between the content provider server, the zero-knowledge edge server node and the end user device, and thereby initiating a content-purchase commercial transaction between the end user device, the content provider server, and the zero-knowledge edge server node, and in response to the entering of the three-way smart contract establishing, by the zero-knowledge edge server node, a communication session over the content delivery network using a zero-knowledge protocol between the end user device and the zero-knowledge edge server node operating in zero knowledge;
anonymously, with respect to the content delivery network, the zero-knowledge server node, and the content provider server, downloading via the established communication session the particular content from the zero-knowledge server node to the end user device, the zero-knowledge server node operating in zero knowledge operates without storing a record of which content was delivered to whom at any given time by avoiding storing information about:
a content delivery session with an end user of the end user device over the established communication session,
an identity of the end user of the end user device, and
an IP address of the end user device;
accessing, by the end user device, the particular content using at least a portion of a content media player application downloaded from the zero-knowledge server node to the end user device in a communication session over the content delivery network using a zero-knowledge protocol between the end user device and the zero-knowledge server node operating in zero knowledge;
registering, by the zero-knowledge server node, the download of the particular content against the smart contract with the content provider server, while not recording and thereby maintaining identity of the end user of the end user device and the IP address of the end user device anonymous with respect to the content delivery network, the zero-knowledge server node and the content provider server;
receiving, at the content provider server, via a relay communication through the zero-knowledge edge server node operating in zero knowledge, a cryptographically verifiable response message from the end user device;
determining, by the content provider server, whether the at least the portion of the content media player application has successfully executed with the particular content at the end user device based on the cryptographically verifiable response message; and
completing in zero knowledge a cryptocurrency smart contract transaction associated with the three-way smart contract while providing three-way anonymity/privacy between the end user of the end user device, the zero-knowledge edge server node, and the content provider server, based on the content provider server receiving the cryptographically verifiable response message from the end user device and therefrom determining the successful execution of the particular content by the at least the portion of the content media player application at the end user device.

13. The information processing system of claim 12, wherein a processor, responsive to executing computer instructions, performs operations comprising:
receiving, with the zero-knowledge edge server node operating in zero knowledge, a payment from the user device as payment for at least delivering the content to the user device;
sending, with the zero-knowledge edge server node operating in zero knowledge, a portion of the received payment to a content provider server that provided the content to the zero-knowledge edge server node, without identifying the end user and the end user device; and
downloading, while in the communication session with the zero-knowledge edge server node operating in zero knowledge, the at least the portion of a content media player application and at least a portion of the particular content from the zero-knowledge edge server node and destined for reception by the end user device, the at least a portion of the content media player application including digital rights management technology using zero-knowledge verifiable computing to enforce usage conditions on the particular content received at the end user device.

14. The information processing system of claim 12, wherein the cryptographically verifiable response message including a report of content usage information of the content by the content media player application and a cryptographically verifiable proof of integrity of the content media player, the content provider server determining from the report and the cryptographically verifiable proof of integrity, and without personally identifiable information of the end user and the end user device, the successful execution, at the end user device, of the at least the portion of the content media player application with the particular content.

15. The information processing system of claim 12, wherein the content comprises at least one of music, a video, software, a game, or a combination thereof.

16. The information processing system of claim 12, wherein the zero-knowledge protocol comprises at least one of:
 a succinct computational integrity and privacy (SCIP) technique;
 a zero-knowledge Succinct non-interactive argument of knowledge (zk-snark) technique; and
 a probabilistically checkable proof (PCP) technique.

17. A non-transitory computer program product for delivering content from a zero-knowledge edge server node in a content delivery network to an end user device to ensure content control by a content provider server, while ensuring privacy of the end user device, with respect to the content delivery network, the non-transitory computer program product comprising a computer readable storage medium having computer readable program code embodied therewith, the computer readable program code including computer instructions, where a processor, responsive to executing the computer instructions, performs operations comprising:
 accessing, by a content provider server, a first API at the zero-knowledge edge server node;
 entering into, by the content provider server, a smart contract between the content provider server and the zero-knowledge edge server node, in response to accessing the second API;
 making available by the zero-knowledge edge server node a particular content for download to end user devices in response to entering into the smart contract;
 accessing, by an end user device, a second API at the zero knowledge edge server node;
 entering into, by the end user device, a three-way smart contract with the content provider server, and the zero-knowledge edge server node;
 initiating, by the end user device, a content-purchase commercial transaction between the end user device, the content provider sever, and the zero-knowledge edge server node, in response to entering into the three-way smart contract;
 establishing by the zero-knowledge edge server node, a communication session over the content delivery network using a zero-knowledge protocol between the end user device and the zero-knowledge edge server node operating in zero knowledge;
 anonymously, with respect to the content delivery network, the zero-knowledge edge server node, and the content provider server, downloading via the established communication session the particular content and the at least a portion of the content media player application from the zero-knowledge edge server node to the end user device, the zero-knowledge edge server node operating in zero knowledge operates without storing a record of which content was delivered to whom at any given time by avoiding-storing information about:
  a content delivery session with an end user of the end user device over the established communication session,
  the identity of the end user of the end user device, and
  an IP address of the end user device;
 accessing, by the end user device, the particular content using the at least a portion of the content media player application;
 registering, by the zero-knowledge edge server node, the download of the particular content against the smart contract with the content provider server, while maintaining identity of the end user and the end user device anonymous with respect to the content delivery network, the zero-knowledge edge server node, and the content provider;
 receiving, at the content provider server via a relay communication through the zero-knowledge edge server node operating in zero knowledge, a cryptographically verifiable response message from the end user device;
 determining, by the content provider server, whether the at least a portion of a content media player application, using the particular content, has successfully executed with the particular content at the end user device based on the cryptographically verifiable response message; and
 completing, in zero knowledge of the end user and the end user device by the content provider server and the zero-knowledge edge server node, a cryptocurrency smart contract transaction associated with the three-way smart contract while providing three-way anonymity/privacy between the end user of the end user device, the zero-knowledge edge server node, and the content provider server, based on the content provider server receiving the cryptographically verifiable response message from the end user device and therefrom determining the successful execution, at the end user device, of the at least the portion of the content media player application with the particular content.

* * * * *